UNITED STATES PATENT OFFICE.

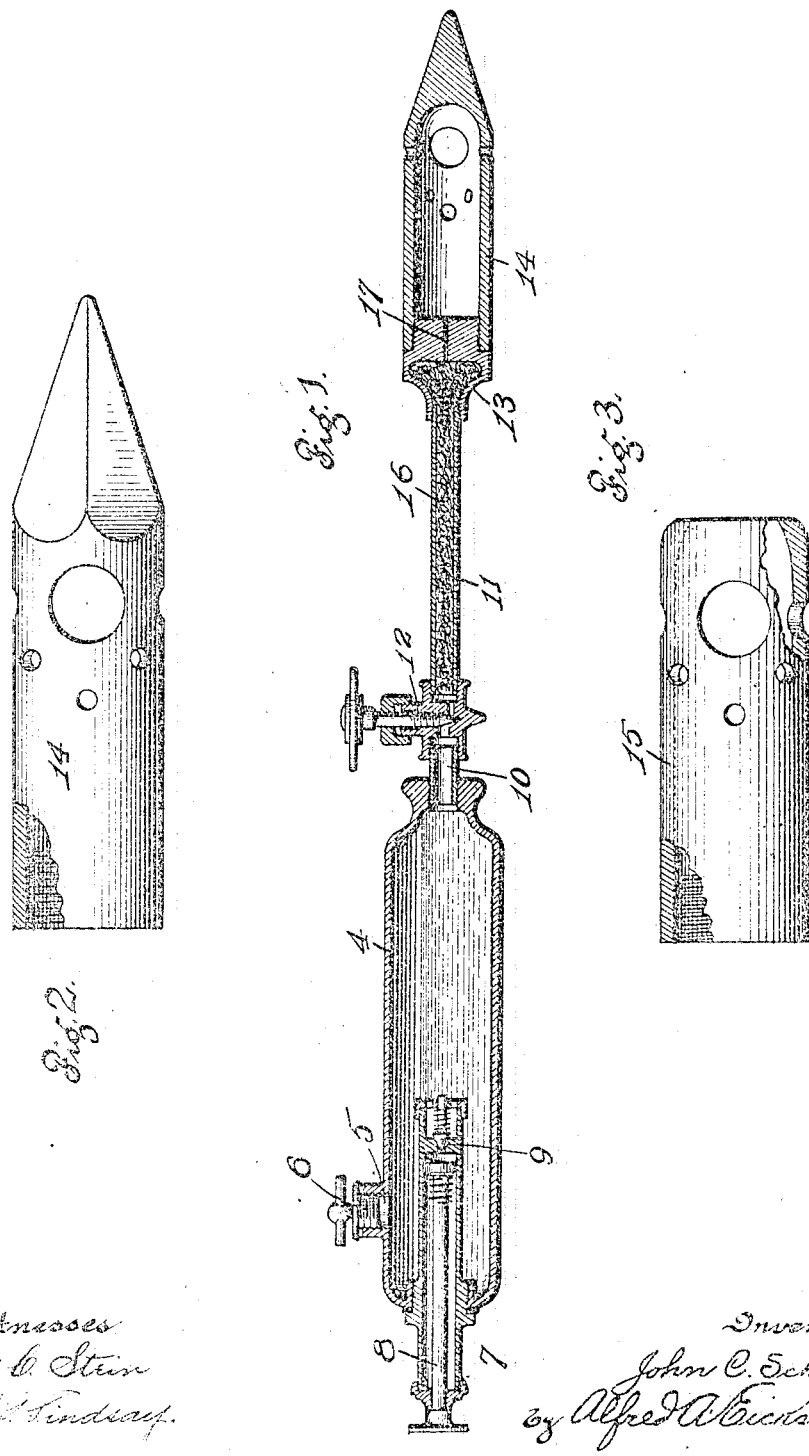

JOHN C. SCHMIDT, OF ST. LOUIS, MISSOURI.

GASOLENE SOLDERING-IRON AND BLOW-TORCH.

1,121,136.   Specification of Letters Patent.   Patented Dec. 15, 1914.

Application filed January 3, 1913. Serial No. 740,032.

*To all whom it may concern:*

Be it known that I, JOHN C. SCHMIDT, a citizen of the United States, and resident of St. Louis, Missouri, have invented certain new and useful Improvements in Gasolene Soldering-Irons and Blow-Torches, of which the following is a specification.

This invention relates to improvements in gasolene soldering irons and blow torches and has for its object a suitable fuel fluid container, an air supply mechanism, a detachable soldering tip and a valve for controlling the feed of the fuel fluid under pressure to be supplied into the soldering tip wherein said fuel is ignited for properly heating said soldering tip.

A further object of my invention is to provide a suitable filtering medium through which the fuel fluid is passed and converted into a gas by the heat from the heated soldering tip.

A further object is to provide a gasolene soldering iron and blow torch with a detachable soldering tip and blow torch nozzle so that the device can be converted from the use of a soldering iron to that of a blow torch.

Figure 1 is a vertical sectional view of my complete invention. Fig. 2 is a side elevation of the soldering iron tip detached. Fig. 3 is a side elevation with a part broken away and in section of the blow torch nozzle or tip.

In the construction of my invention I provide a suitable container or receptacle 4 in which the gasolene or fuel fluid is contained and is admitted into the receptacle through the opening 5 in which is properly inserted a screw cap or plug 6. In the end of the receptacle is located an air pump 7, a portion thereof extending into the receptacle and a portion beyond said receptacle; in this pump is located a suitable piston 8 by which air is pumped into the receptacle and as the piston plunger is reciprocated the air is forced into the receptacle through the valve 9; this air providing suitable pressure so as to force the fuel fluid through the nipple 10 into the pipe 11; the passage of this fluid being controlled by the valve 12.

On the end of the pipe 11 is located a cap 13 on which is screwthreaded the soldering tip 14 or the blow torch tip or nozzle 15; the interior of the cap 13 is hollow and in the same and in the pipe 11 is placed a filtering material 16 such as mineral wool, asbestos or other suitable material through which the fuel fluid is to pass before entering into the soldering tip or torch nozzle through the opening 17 formed in said cap. The supply of fluid under pressure is forced into the tip through the opening or jet 17 in a very fine spray and instantly ignited by the heat of the tip supplying said tip at all times with sufficient heat so that the device is in continual operation.

In first igniting the device, the pump is actuated to supply the receptacle with sufficient air, the valve 12 is operated so as to permit the fuel under pressure to enter into the pipe 11, passing through the filler therein and spraying a fine spray into the nozzle; this spray being ignited and after the soldering tip has become properly heated the fluid is converted into a gas and such gas as is forced through the jet remains ignited for supplying said tip with sufficient heat.

The device when used as a soldering iron has merit which the ordinary soldering iron is lacking; in this, that the iron when once properly ignited can be continuously used for soldering purposes as its heat is continuous and regular and the act of reheating the tip by placing the same in a charcoal oven or stove as is done when using the ordinary soldering irons is dispensed with. The instrument can be used in a vertical, horizontal or any other angle or position and its weight in the hands of the operator is counterbalanced by reason of the fuel carrying handle conforming in weight with that of the soldering tip; the supply of fuel to the tip being of course regulated by the manipulation of the valve 12.

When it is desired to convert the device from a soldering iron to a blow torch the soldering iron tip 14 is removed and the tip 15 placed on the cap in its stead, the gas escaping from the jet 17 forcing a flame through the end of the nozzle.

Having fully described my invention what I claim is:

A gasolene soldering iron comprising an elongated hollow tubular handle, a fuel inlet located on one side thereof, an air pump secured to the end of the handle and projecting into the same; a nipple inserted in the opposite end of the handle, a hand valve connected to said nipple, a pipe connected to the valve, a hollow head having its end constructed of thicker material than the remainder of the same and said head being detachably connected to the end of the pipe; a filter of non-ignitable material packed into the pipe and hollow portion of the head, the thick portion of said head being provided with a small central opening through which the filtered fluid is permitted to escape; and a detachable hollow soldering tip located on the thick portion of the head, substantially as specified.

In testimony whereof, I have signed my name to this specification, in presence of two subscribing witnesses.

JOHN C. SCHMIDT.

Witnesses:
 ALFRED A. EICKS,
 WALTER C. STEIN.